United States Patent
Mitchell (10) Patent No.: US 6,675,157 B1
(45) Date of Patent: Jan. 6, 2004

(54) SYSTEM AND METHOD FOR BALANCING BINARY SEARCH TREES

(75) Inventor: David Simon Mitchell, Marietta, GA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/431,807

(22) Filed: Nov. 1, 1999

(51) Int. Cl.[7] .............................................. G06F 17/30
(52) U.S. Cl. ................................... 707/2; 707/100
(58) Field of Search ................. 707/1–10, 100–104.1, 707/200–204

(56) References Cited

U.S. PATENT DOCUMENTS

| | | | |
|---|---|---|---|
| 4,024,508 A | * 5/1977 | Bachman et al. ............... 707/1 |
| 4,870,662 A | * 9/1989 | Lindbergh et al. .......... 341/107 |
| 5,257,365 A | 10/1993 | Powers et al. .............. 395/600 |
| 5,412,807 A | 5/1995 | Moreland .................... 395/600 |
| 5,414,704 A | * 5/1995 | Spinney ....................... 370/389 |
| 5,418,947 A | 5/1995 | Hsu et al. ..................... 395/600 |
| 5,446,887 A | 8/1995 | Berkowitz ................... 395/600 |
| 5,522,068 A | 5/1996 | Berkowitz ................... 395/600 |
| 5,551,024 A | * 8/1996 | Waters ........................... 707/3 |
| 5,557,786 A | 9/1996 | Johnson, Jr. ................ 395/600 |
| 5,615,366 A | * 3/1997 | Hansen ........................... 704/8 |
| 5,848,404 A | 12/1998 | Hafner et al. .................. 707/3 |
| 5,950,191 A | * 9/1999 | Schwartz ........................ 707/1 |
| 6,029,170 A | * 2/2000 | Garger et al. .................. 707/1 |
| 6,047,283 A | * 4/2000 | Braun ............................. 707/2 |
| 6,144,965 A | * 11/2000 | Oliver ......................... 707/100 |
| 6,185,569 B1 | * 2/2001 | East et al. ................... 707/100 |
| 6,240,422 B1 | * 5/2001 | Atkins et al. ............... 345/764 |
| 6,298,340 B1 | * 10/2001 | Calvignac et al. ............. 707/1 |
| 6,311,092 B1 | * 10/2001 | Yamada ....................... 381/61 |

OTHER PUBLICATIONS

Conference Proceedings, 1988 IEEE Southeastcon, Apr. 11–13, 1998, "New Algorithms for Balancing Binary Search Trees," E. Haq, Y. Cheng and S.S. Iyengar.

* cited by examiner

*Primary Examiner*—Greta Robinson
*Assistant Examiner*—Harold E. Dodds, Jr.
(74) *Attorney, Agent, or Firm*—Bracewell & Patterson LLP (57) ABSTRACT

An improved binary search tree (BST) balancing facility balances BSTs by copying pointers to the nodes of a BST into a pointer list in accordance with a sequential order of respective data values of the nodes. The balancing facility then builds a balanced BST based on a first index to a first pointer of the pointer list and a second index to a last pointer of the pointer list. In an illustrative embodiment, the balanced BST is built by identifying a central pointer at a midpoint of the pointer list, a left range of pointers before the midpoint, and a right range of pointers after the midpoint. The central pointer is then interpreted as a pointer to a root node, and a balanced left subtree of the root node and a balanced right subtree of the root node are built based on the left range of pointers and the right range of pointers, respectively.

21 Claims, 9 Drawing Sheets

| Address | Tree Ptr |
|---|---|
| 1 | 2 |

310

| Address | Value | Left Ptr | Right Ptr |
|---|---|---|---|
| 2 | Eve | 3 | 4 |
| 3 | Charles | 5 | 6 |
| 4 | Frank | 0 | 0 |
| 5 | Bill | 7 | 0 |
| 6 | Diane | 0 | 0 |
| 7 | Adam | 0 | 0 |

| Address | Index | Value | (Data Value @ Address) |
|---|---|---|---|
| 102 | 1 | 7 | (Adam) |
| 103 | 2 | 5 | (Bill) |
| 104 | 3 | 3 | (Charles) |
| 105 | 4 | 6 | (Diane) |
| 106 | 5 | 2 | (Eve) |
| 107 | 6 | 4 | (Frank) |

*Fig. 9*

| Address | Tree Ptr |
|---|---|
| 1 | 3 |

310

| Address | Value | Left Ptr | Right Ptr |
|---|---|---|---|
| 2 | Eve | 6 | 4 |
| 3 | Charles | 7 | 2 |
| 4 | Frank | 0 | 0 |
| 5 | Bill | 0 | 0 |
| 6 | Diane | 0 | 0 |
| 7 | Adam | 0 | 5 |

```
LinearBalance( TreePointer )                                    ⌐500
count = CountOfNodesInTree( TreePointer )
CreateArray( PointerList, count * NodePointerSize )
count = 0
CopyNodesToArray ( TreePointer, PointerList, count )
TreePointer = ReAssignNodePointers ( PointerList, 1, count )
```

*Fig. 5*

```
CopyNodesToArray ( NodePointer, PointerList, count )            ⌐600
IF ( NodePointer != null ) THEN
      CopyNodesToArray ( NodePointer -> Left, PointerList, count)
      count = count + 1
      pointer_array ( count ) = NodePointer
      CopyNodesToArray( NodePointer -> Right, PointerList, count )
ENDIF
```

*Fig. 6*

```
ReAssignNodePointers ( PointerList, first, last )
IF ( first > last ) THEN
    RETURN ( null )
ELSE
    middle = ( first + last ) / 2
    current_node_pointer = PointerList ( middle )
    current_node_pointer -> left = ReAssignNodePointers( PointerList, first, middle - 1 )
    current_node_pointer -> right = ReAssignNodePointers( PointerList, first, middle + 1, last )
    RETURN ( current_node_pointer )
ENDIF
```

*Fig. 7*

| | |
|---|---|
| 1 | IF ( [2] != null ) THEN |
| 1 | CopyNodesToArray( [3] )       ⌐800 |
| 2L | IF ( [3] != null ) THEN |
| 2L | CopyNodesToArray( [5] ) |
| 3L | IF ( [5] != null ) THEN |
| 3L | CopyNodesToArray( [7] ) |
| 4L | IF ( [7] != null ) THEN |
| 4L | CopyNodesToArray( [0] ) |
| 5L | IF ( [0] != null ) THEN |
| 5L | ENDIF |
| 4L | count = count + 1 |
| 4L | pointer_array ( [1] ) = [7] |
| 4L | CopyNodesToArray( [0] ) |
| 5R | IF ( [0] != null ) THEN |
| 5R | ENDIF |
| 4L | ENDIF |
| 3L | count = count + 1 |
| 3L | pointer_array ( [2] ) = [5] |
| 3L | CopyNodesToArray( [0] ) |
| 4R | IF ( [0] != null ) THEN |
| 4R | ENDIF |
| 3L | ENDIF |
| 2L | count = count + 1 |
| 2L | pointer_array ( [3] ) = [3] |
| 2L | CopyNodesToArray( [6] ) |
| 3R | IF ( [6] != null ) THEN |
| 3R | CopyNodesToArray( [0] ) |
| 4L | IF ( [0] != null ) THEN |
| 4L | ENDIF |
| 3R | count = count + 1 |
| 3R | pointer_array ( [4] ) = [6] |
| 3R | CopyNodesToArray( [0] ) |
| 4R | IF ( [0] != null ) THEN |
| 4R | ENDIF |
| 3L | ENDIF |
| 2L | ENDIF |
| 1 | count = count + 1 |
| 1 | pointer_array ( [5] ) = [2] |
| 1 | CopyNodesToArray( [4] ) |
| 2R | IF ( [4] != null ) THEN |
| 2R | CopyNodesToArray( [0] ) |
| 3L | IF ( [0] != null ) THEN |
| 3L | ENDIF |
| 2R | count = count + 1 |
| 2R | Pointer_array ( count [6] ) = NodePointer [4] |
| 2R | CopyNodesToArray( [0] ) |
| 3R | IF ( [0] != null ) THEN |
| 3R | ENDIF |
| 2R | ENDIF |
| 1 | ENDIF |

Fig. 8

```
                                          ┌1000
1      IF ( [1] > [6] ) THEN
1      ELSE
1      middle = ( [1] + [6] ) /2
1      current_node_pointer = pointer_array ( [3] )
1      current_node_pointer -> left = ReAssignNodePointers( [1], [2] )
2L        ⎧ IF ( [1] > [2] ) THEN
2L        ⎪ ELSE
2L        ⎪ middle = ( [1] + [2] ) /2
2L        ⎪ current_node_pointer = pointer_array ( [1] )
2L        ⎪ current_node_pointer -> left = ReAssignNodePointers( [1], [0] )
3L        ⎪     IF ( [1] > [0] ) THEN
3L        ⎪     RETURN (null)
2L        ⎪ current_node_pointer -> right = ReAssignNodePointers( [2], [2] )
3R        ⎪    ⎧ IF ( [2] > [2] ) THEN
3R        ⎪    ⎪ ELSE
3R        ⎨    ⎪ middle = ( [2] + [2] ) / 2
3R        ⎪    ⎨ current_node_pointer = pointer_array ( [2] )
3R        ⎪    ⎪ current_node_pointer -> left = ReAssignNodePointers( [2], [1] )
4L        ⎪    ⎪     IF ( [2] > [1] ) THEN
4L        ⎪    ⎪     RETURN ( null )
3R        ⎪    ⎪ current_node_pointer -> right = ReAssignNodePointers( [3], [2] )
4R        ⎪    ⎪     IF ( [3] > [2] ) THEN
4R        ⎪    ⎪     RETURN ( null )
3R        ⎪    ⎪ RETURN ( [5] )
3R        ⎪    ⎩ ENDIF
2L        ⎪ RETURN ( [7] )
2L        ⎩ ENDIF
1      current_node_pointer -> right = ReAssignNodePointers( [4], [6] )
```

1 (dup.)   current_node_pointer -> right = ReAssignNodePointers( [4], [6] )
2R         ⎧   IF ( [4] > [6] ) THEN
2R         ⎪   ELSE
2R         ⎪   middle = ( [4] + [6] ) / 2
2R         ⎪   current_node_pointer = pointer_array ( [5] )
2R         ⎪   current_node_pointer -> left = ReAssignNodePointers( [4], [4] )
3L         ⎪   ⎧   IF ( [4] > [4] ) THEN
3L         ⎪   ⎪   ELSE
3L         ⎪   ⎪   middle = ( [4] + [4] ) / 2
3L         ⎪   ⎪   current_node_pointer = pointer_array ( [4] )
3L         ⎪   ⎪   current_node_pointer -> left = ReAssignNodePointers( [4], [3] )
4L         ⎪   ⎨       IF ( [4] > [3] ) THEN
4L         ⎪   ⎪       RETURN ( null )
3L         ⎪   ⎪   current_node_pointer -> right = ReAssignNodePointers( [5], [4] )
4R         ⎪   ⎪       IF ( [5] > [4] ) THEN
4R         ⎪   ⎪       RETURN ( null )
3L         ⎪   ⎨   RETURN ( [6] )
3L         ⎪   ⎩   ENDIF
2R         ⎪   current_node_pointer -> right = ReAssignNodePointers( [6], [6] )
3R         ⎪   ⎧   IF ( [6] > [6] ) THEN
3R         ⎪   ⎪   ELSE
3R         ⎪   ⎪   middle = ( [6] + [6] ) / 2
3R         ⎪   ⎪   current_node_pointer = pointer_array ( [6] )
3R         ⎪   ⎪   current_node_pointer -> left = ReAssignNodePointers( [6], [5] )
4L         ⎪   ⎨       IF ( [6] > [5] ) THEN
4L         ⎪   ⎪       RETURN ( null )
3R         ⎪   ⎪   current_node_pointer -> right = ReAssignNodePointers( [7], [6] )
4R         ⎪   ⎪       IF ( [7] > [6] ) THEN
4R         ⎪   ⎪       RETURN ( null )
3R         ⎪   ⎪   RETURN ( [4] )
3R         ⎪   ⎩   ENDIF
2R         ⎨   RETURN ( [2] )
2R         ⎩   ENDIF
1          RETURN ( [3] )
1          ENDIF
```

Fig. 10B ns# SYSTEM AND METHOD FOR BALANCING BINARY SEARCH TREES

BACKGROUND OF THE INVENTION

1. Technical Field

The present invention relates in general to data processing and in particular to organizing information that is stored in a data processing system so that the information may be accessed efficiently. Still more particularly, the present invention relates to an improved system and method for balancing binary search trees.

2. Description of the Related Art

Advances in data processing technology have led to the commonplace utilization of information repositories (e.g., database files or tables) that contain millions of records. Furthermore, the records are often organized using data structures that provide a sequential record order, based on values contained within the records. For example, a telephone company might maintain a file (or data set) that contains the name of each customer in a particular service area, and that file might be maintained in alphabetical order, according to customer name.

Primitive database systems provide ordering for such files by simply keeping records in sequential physical memory locations (such as on tape or in a disk drive) according to the desired order. Such an organization is essentially an array, and it is inefficient, and therefore rarely used, when processing large files because records usually cannot be added and deleted without altering a large percentage of the utilized storage. Other database systems employ more sophisticated data structures that utilize pointers to order records. Linked lists and binary search trees (BSTs) are two such data structures, and both allow records to be added and deleted more efficiently, relative to arrays. However, when data sets are searched for particular values (a step that is prerequisite to adding and deleting records in any ordered data set), binary search trees are much more efficient than linked lists. While search techniques for linked lists are linear searches, and thus have worst-case run times on the order of 'n' (i.e., the run time is directly proportional to the total number of records), techniques for searching BSTs are typically binary searches, and thus have worst-case run times on the order of '$\log_2(n)$' (i.e., the run time is directly proportional to the log to the base 2 of the total number of records), provided the BST is balanced. For example, if a telephone company's file of customers for a particular service area includes 6,000,000 customer names, a worst-case linear search will process 6,000,000 records and an average linear search will process 3,000,000 records, whereas a worst-case binary search will process no more than $\log_2(6,000,000)=23$ records.

However, as insert and delete operations are performed on a BST, the tree may lose its balanced state, and the worst-case run time can deteriorate to the order of 'n.' Consequently, the importance of keeping a BST in a balanced state, or nearly so, is commonly recognized. A BST is considered balanced when, for each node, the number of nodes in the left subtree of that node and the number of nodes in the right subtree of that node differ, at most, by one.

Numerous methods for balancing binary search trees have been developed, however those methods present a number of disadvantages. For example, "New Algorithms For Balancing Binary Search Trees" by E. Haq, Y. Cheng, and S. S. Iyengar (1988 IEEE SOUTHEASTCON Conference Proceedings, pp. 378–82) (hereinafter New Algorithms) discloses an algorithm that, given an unbalanced binary search tree and a count of the nodes in that tree, computes how many levels a corresponding balanced binary search tree should have and how many nodes should reside on particular levels of that balanced tree and then balances the tree based on those computations. As suggested by New Algorithms, an advantage provided by such a technique is its adaptability for parallel processing. Among the disadvantages associated with the New Algorithms technique, however, are the number and complexity of instructions used to perform the balancing.

Furthermore, as the number of records to be balanced increases, so does the time associated with executing a lengthy and complex tree balancing utility. In fact, tests have shown that, when balancing a BST containing millions of records, the difference between inefficient and efficient balancing facilities can mean the difference between spending over an hour balancing the tree and spending less than a minute. The present invention recognizes that the need for an efficient technique for balancing BSTs becomes more pressing as databases containing millions of records become more commonplace.

SUMMARY OF THE INVENTION

To address the shortcomings of conventional tree balancing facilities, the present invention provides a system, method, and program product that balances BSTs by copying pointers to the nodes of a BST into a pointer list in accordance with a sequential order of respective data values of the nodes. The balacing facility then builds a balanced BST based on a first index to a first pointer of the pointer list and a second index to a last pointer of the pointer list. In an illustrative embodiment, the balanced BST is built by identifying a central pointer at a midpoint of the pointer list, a left range of pointers before the midpoint, and a right range of pointers after the midpoint. The central pointer is then interpreted as a pointer to a root node, and a balanced left subtree of the root node and a balanced right subtree of the root node are built based on the left range of pointers and the right range of pointers, respectively.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
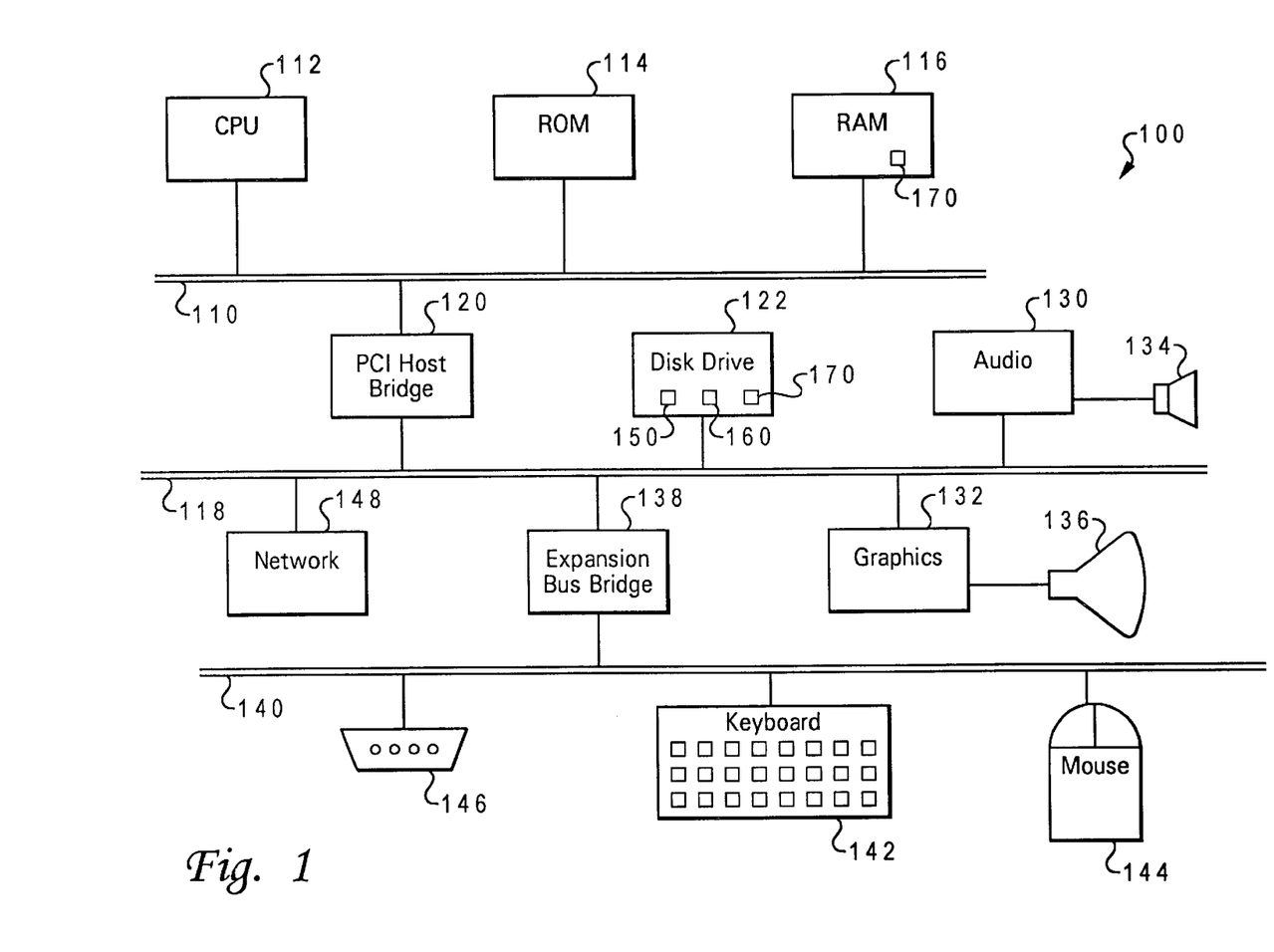
FIG. 1 depicts a block diagram of an illustrative embodiment of a data processing system with facilities for balancing BSTs according to the present invention.

With reference now to the figures, and in particular with reference to FIG. 1, there is depicted a block diagram of a data processing system (DPS) 100 with facilities for balancing BSTs according to an illustrative embodiment of the present invention. As shown, DPS 100 includes a system bus 110 that is connected to a central processing unit (CPU) 112 and to memory, including read only memory (ROM) 114 and random access memory (RAM) 116. System bus 110 is coupled to a PCI local bus 118 through a PCI host bridge 120. PCI local bus 118 is connected to one or more additional non-volatile data storage devices, such as a disk drive 122, and to an audio adapter 130 and a graphics adapter 132 for controlling audio output through a speaker 134 and visual output though a display device 136, respectively. An expansion bus bridge 138, such as a PCI-to-ISA bus bridge, connects PCI local bus 118 to an ISA bus 140, which is attached (through appropriate adapters) to a keyboard 142 and a mouse 144 for receiving operator input.

DPS 100 may also include data ports for communicating with external equipment, such as other data processing systems. Those data ports may include, without limitation, a serial port 146 attached to ISA bus 140 for linking DPS 100 to remote data processing systems via a modem (not illustrated) and a network adapter 148 attached to PCI bus 118 for linking DPS 100 into a local area network (not illustrated).

Stored on disk drive 122 are at least one set of data, such as a Customer-Name BST 150, and a database system 160. Database system 160 is loaded into RAM 116 and executed on CPU 112 to provide an interface that allows records to be read from, added to, and deleted from Customer-Name BST 150 by conventional application programs, such as a Customer Account Maintenance application (not illustrated). Each record (or node) of Customer-Name BST 150 contains a customer name.

When Customer-Name BST 150 is balanced, searches of Customer-Name BST 150 for particular records are efficient, in that such searches have a time complexity of $\log_2(n)$, where n equals the number of nodes in the tree. As records are added to and deleted from the tree, however, the tree will likely become unbalanced, and the time complexity for searching the tree for a particular value will consequently increase towards n. Therefore, in order to maintain optimal search times, it is necessary to rebalance Customer-Name BST 150, either periodically (such as every night) or in response to a determination that the tree has exceeded an acceptable level of unbalance (such as by monitoring search times or examining the topography of the tree). Consequently, a tree balancing facility 170 according to an illustrative embodiment of the present invention is stored on disk drive 122 and, when rebalancing is desired, that program is loaded into RAM 116 and executed on CPU 112 to return Customer-Name BST 150 to a balanced state.

Figure 2:
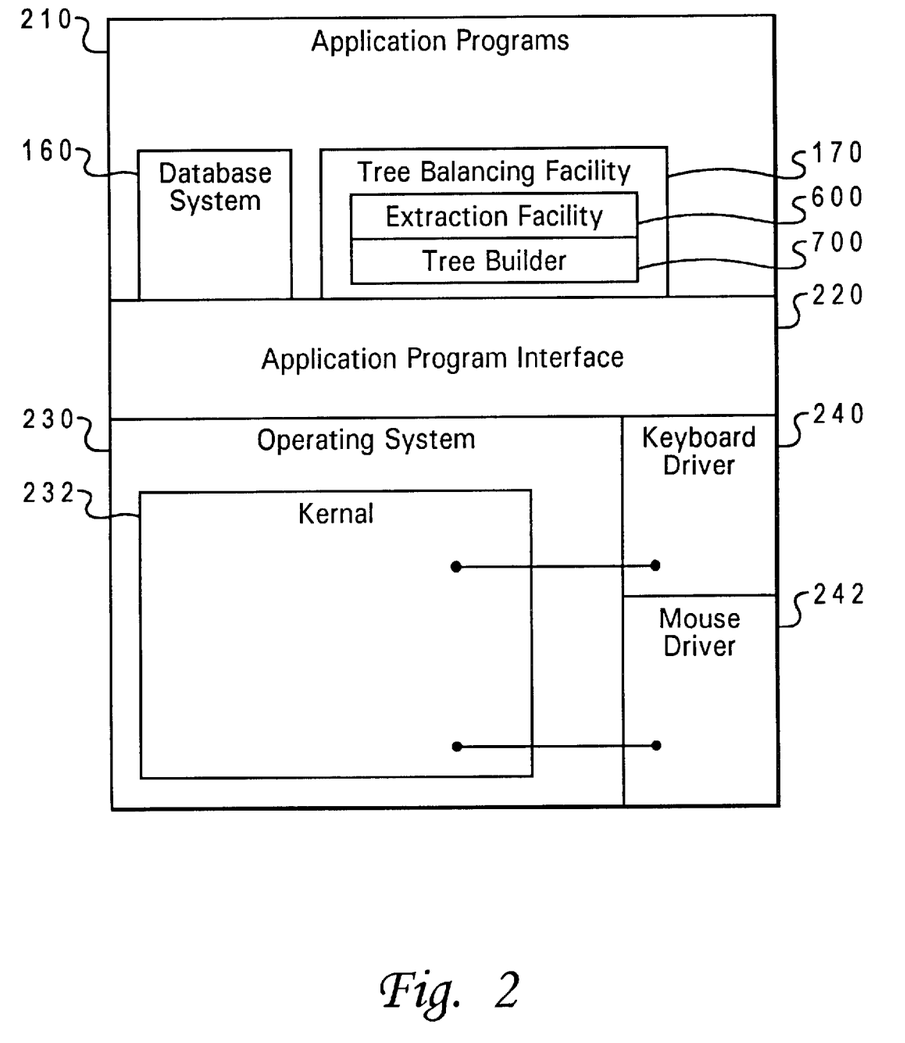
FIG. 2 is a layer diagram of exemplary software residing in the data processing system of FIG. 1.

With reference now to FIG. 2, there is illustrated a layer diagram of illustrative software in data processing system 100 according to the present invention. At the highest level of the diagram are the application programs 210, including database system 160 and tree balancing facility 170. Preferably, tree balancing facility 170 includes two major components: an extraction facility 600 and a tree builder 700. At the intermediate level is an application program interface (API) 220, through which application programs 210 request services from the operating system 230. Operating system 230, which occupies the lowest level of the diagram, manages the operations of data processing system 100 by performing duties such as resource allocation, task management, and error detection. Included in operating system 230 is a kernel 232 that manages the memory, files, and peripheral devices of data processing system 100. The lowest level also includes device drivers, such as a keyboard driver 240 and a mouse driver 242, that kernel 232 utilizes to manage input from and output to peripheral devices.

Figure 3:
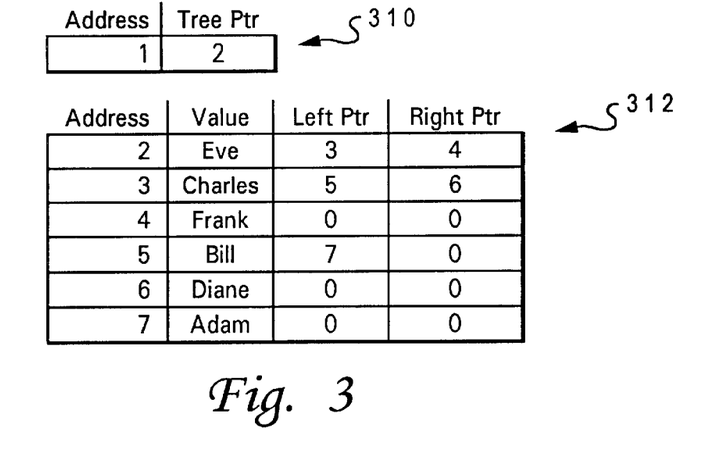
FIG. 3 depicts a physical organization of an exemplary unbalanced BST.
Figure 4:
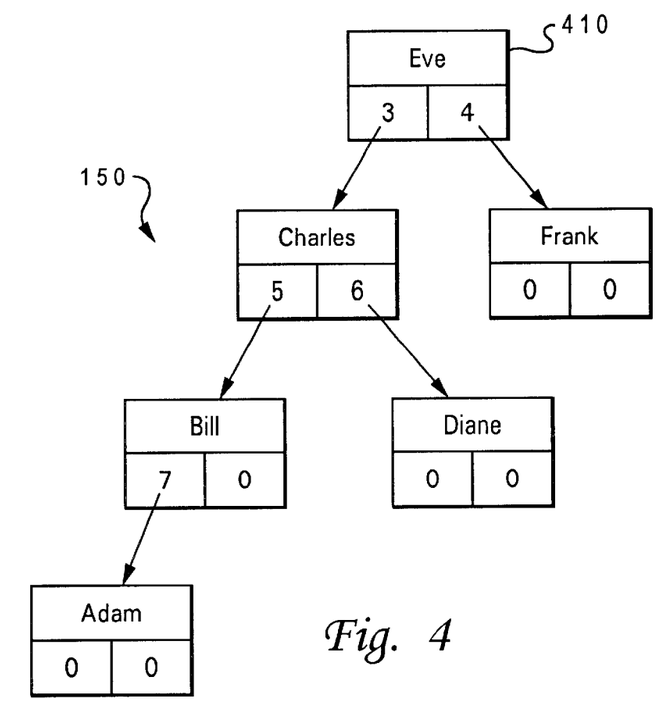
FIG. 4 illustrates a logical organization of the BST of FIG. 3.

Referring now to FIGS. 3 and 4, there are depicted illustrative physical and logical representations, respectively, of Customer-Name BST 150 in an unbalanced state. Customer-Name BST 150 include a tree pointer 310 and a set of six records or nodes 312 arranged in four levels. In the illustrative embodiment, tree pointer 310 is stored in disk drive 122 at location (or address) 1, and, as shown in FIG. 3, tree pointer 310 contains the address of the root node 410 of Customer-Name BST 150 (i.e., address 2). Each node of Customer-Name BST 150, including root node 410, contains a data value, a left pointer, and a right pointer. Each left pointer and each right pointer contains either a pointer value for a left or right subordinate node, respectively, or is null (i.e., contains a null pointer value, illustrated herein as the pointer value 0). For example, root node 410 contains the data value "Eve," an address of 3 in the left pointer, and an address of 4 in the right pointer. Accordingly, the right subtree of root node 410 starts at (i.e., has a root at) location 4. As shown, the data value of the node at location 4 is "Frank," and the left and right pointers of that node are null.

In the illustrative embodiment, the left subtree of root node 410 has four nodes, while the right subtree has only one node; therefore, Customer-Name BST 150 is not balanced. Consequently, in order to optimize Customer-Name BST 150 for searches, it is necessary to balance Customer-Name BST 150.

Figure 5:
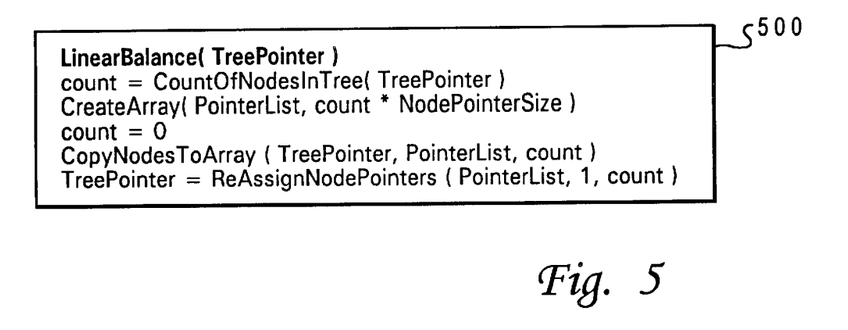
FIG. 5 depicts the instructions of an exemplary main routine for balancing BSTs according to the present invention.
Figure 6:
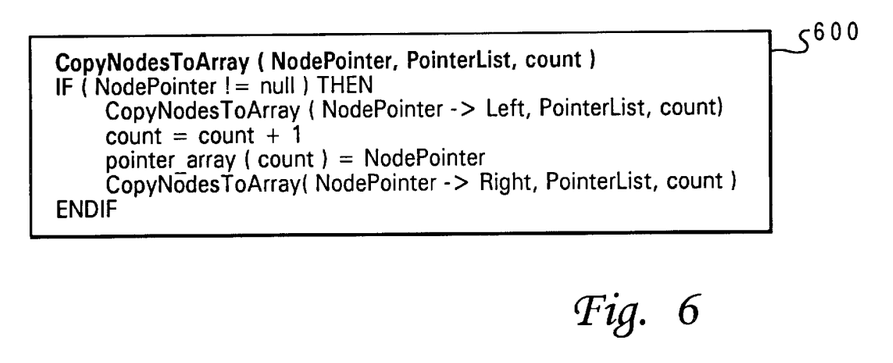
FIG. 6 illustrates the instructions of an exemplary extraction facility according to the present invention.
Figure 7:
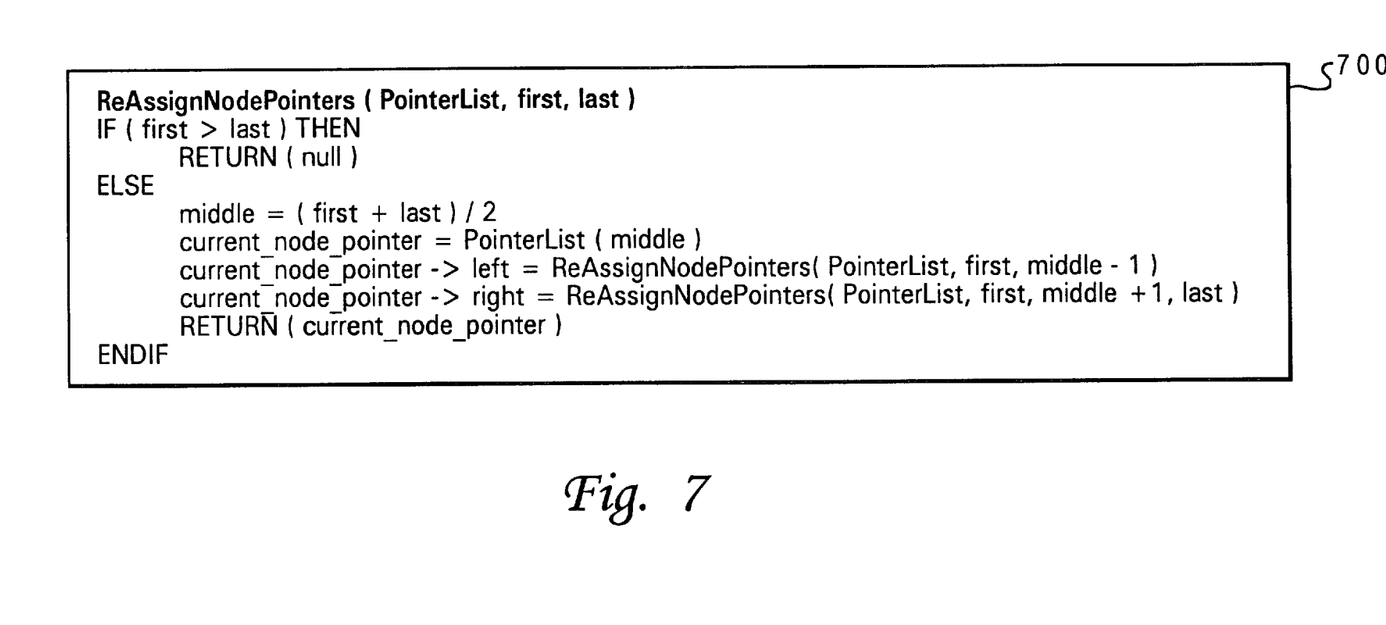
FIG. 7 depicts the instructions of an exemplary tree builder according to the present invention.

With reference now to FIGS. 5, 6, and 7, there are illustrated an exemplary BST balancing facility 500, extraction facility 600, and tree builder 700 according to the present invention. Balancing facility 500 begins by accepting a pointer to a tree to be balanced and creating an array just large enough to hold a node pointer for each node in that tree. Then, as described in greater detail below, balancing facility 500 calls extraction facility 600 to build a pointer list and tree builder 700 to produce a balanced tree based on that pointer list.

Figure 8:
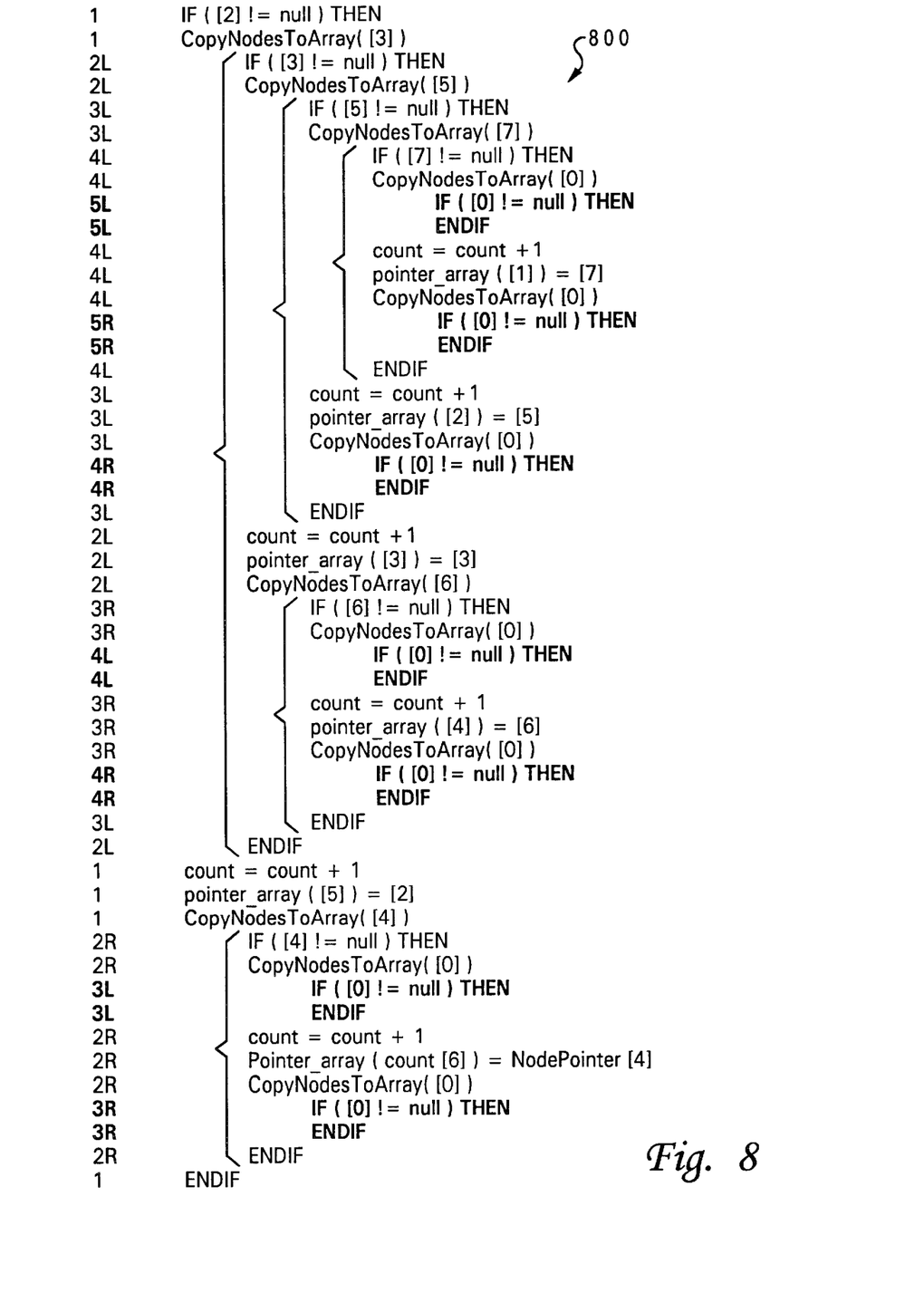
FIG. 8 illustrates an instruction trace of the extraction facility of FIG. 6 when executed to build a pointer list for the BST of FIG. 3.

As shown in FIG. 6, extraction facility 600 accepts a node pointer as input and produces an array of pointers (i.e., a pointer list) ordered according to the sequence of the data values in the tree that starts at the specified node. Referring now to FIG. 8, there is illustrated a simplified instruction trace 800 that results from processing Customer-Name BST 150 with extraction facility 600. Instruction trace 800, which illustrates parameter values in square brackets in place of parameter labels, begins when balancing facility 500 calls extraction facility 600 with tree pointer 310. As shown by the lines with a recursion level indicator of 1 in the left margin, extraction facility 600 builds a pointer list by (a) using recursion (i.e., calling itself) to process the left subtree of the current node, then (b) incrementing a current position of the pointer list and then copying the input node pointer (i.e., the address of the current node) to that current position, and then (c) using recursion to process the right subtree of the current node. However, as shown by the boldface lines at recursion levels 5L, 5R, 4R, 4L, 4R, 3L, and 3R, whenever the input node pointer is null, extraction facility 600 executes a return to the caller without altering the counter or the pointer list.

Figure 9:
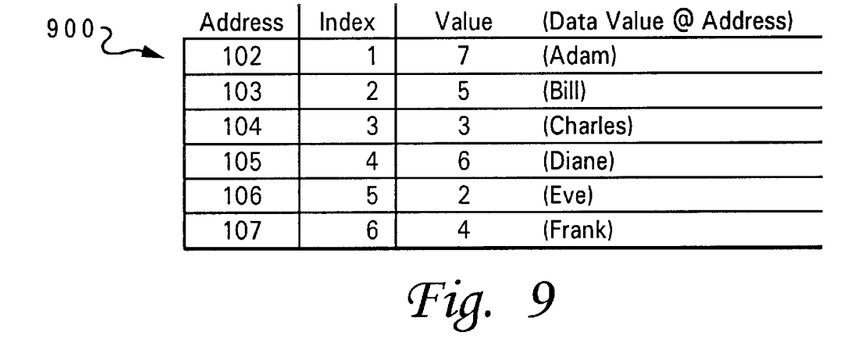
FIG. 9 depicts the pointer list produced according to the instruction trace of FIG. 8.

With reference now to FIG. 9, there is depicted the pointer list 900 that is produced according to instruction trace 800. As shown, after extraction facility 600 has finished, pointer list 900 contains the addresses of the nodes of Customer-Name BST 150 in data value sequence. It should be noted, however, that, although the data value of each node (e.g., "Adam") is also illustrated in FIG. 9, those values are shown only to help explain the significance of the stored addresses. Preferably, the data values are not stored in the pointer list, as to do so would be inefficient.

Figure 10A:
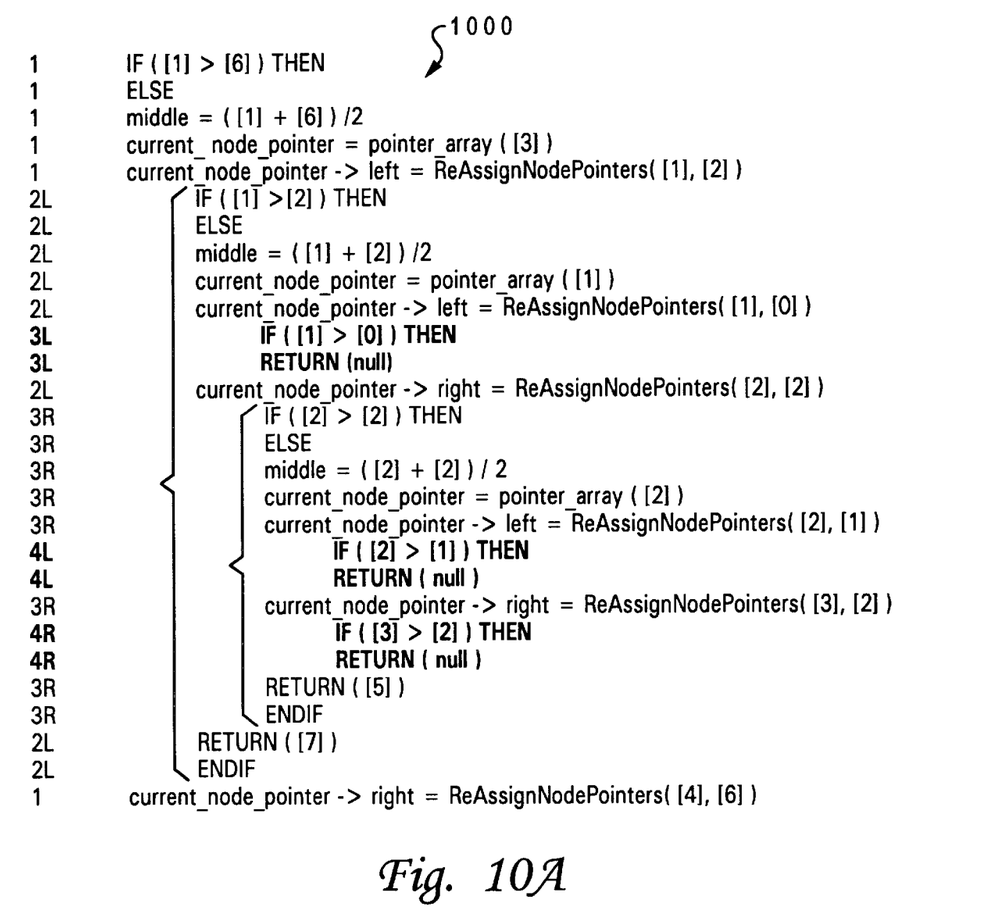
FIGS. 10A and 10B depict an instruction trace of the tree builder of FIG. 7 when executed to balance the BST of FIG. 3 based on the pointer list of FIG. 9.
Figure 10B:
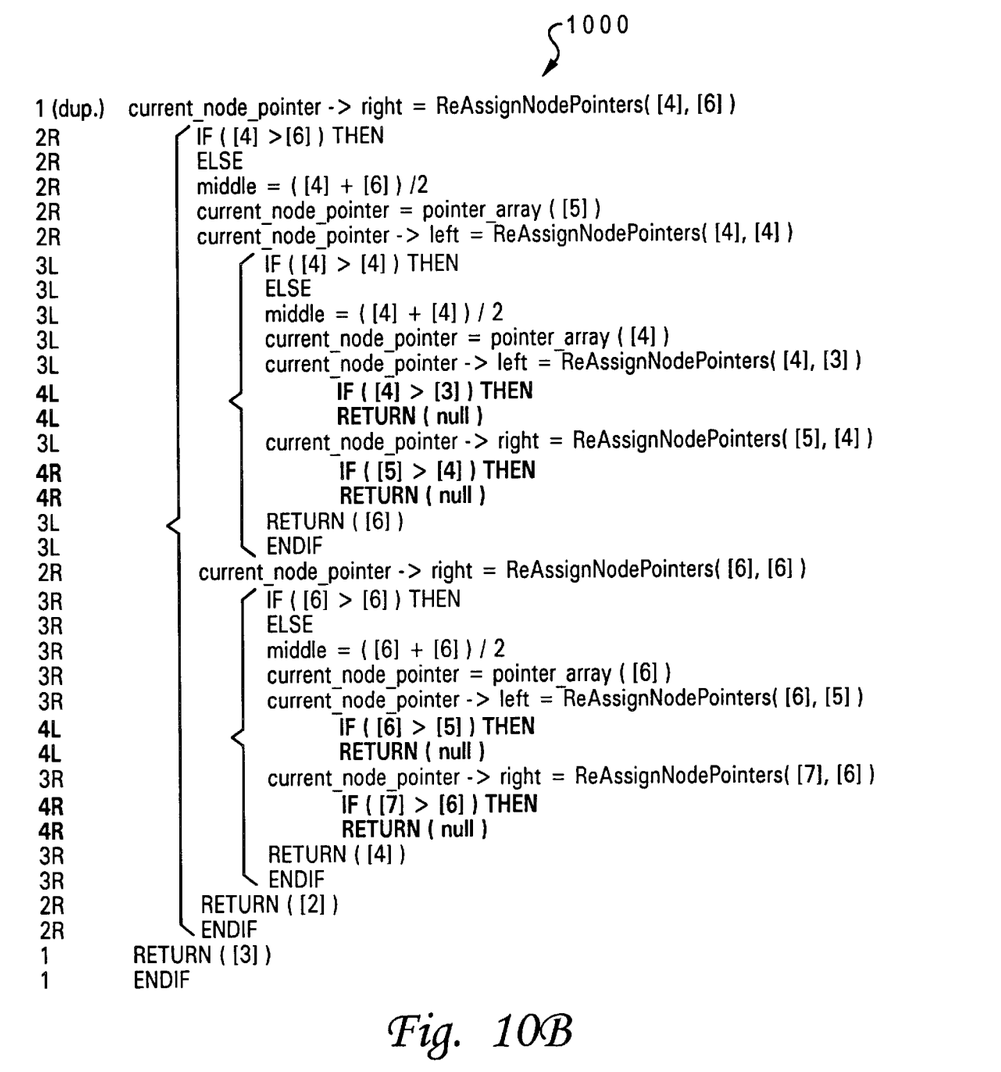

As shown in FIG. 5, after obtaining pointer list 900, balancing facility 500 converts Customer-Name BST 150 from an unbalanced state to a balanced state by invoking tree builder 700 with the first and last index values for pointer list 900. With reference now to FIGS. 10A and 10B, there is illustrated a simplified instruction trace 1000 of the execution of tree builder 700. Instruction trace 1000, which also presents parameter values in square brackets, begins when balancing facility 500 calls tree builder 700 with the first and last index values for pointer list 900 (i.e., index values 1 and 6). As shown by the lines with a recursion level indicator of 1 in the left margin, tree builder 700 balances Customer-Name BST 150 by (a) identifying a central pointer at a midpoint of pointer list 900, (b) interpreting that pointer as a pointer to a current root node, (c) using recursion to build balanced left and right subtrees for that current root node, and (d) returning the central pointer to the caller. However, as shown by the boldface lines at recursion levels 3L, 4L, 4R, 4L, 4R, 4L, and 4R, whenever an empty or null range of addresses has been received (i.e., whenever the first index is greater than the last index), tree builder 700 does not issue another recursive call, but simply returns a null pointer.

Figure 11:
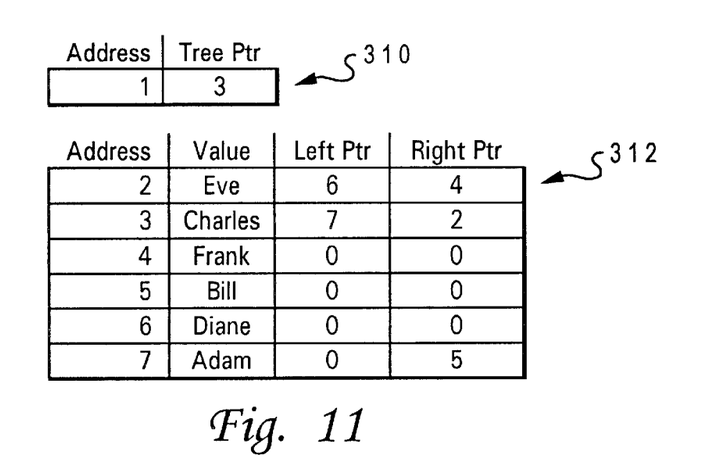
FIG. 11 illustrates an exemplary physical organization of the BST of FIG. 3 after that tree has been balanced according to the instruction trace of FIGS. 10A and 10B.
Figure 12:
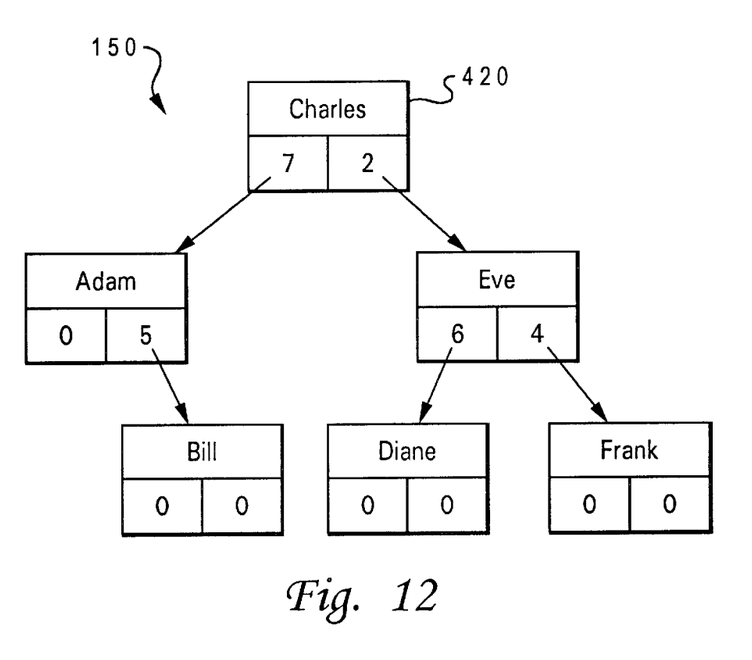
FIG. 12 depicts a logical organization of the BST of FIG. 11.

Referring now to FIGS. 11 and 12, there are depicted physical and logical illustrations, respectively, of Customer-Name BST 150 following the execution of balancing facility 500. As shown, tree pointer 310 points to a new root node 420, and the left and right pointers of many of the nodes within the tree have been modified so that Customer-Name BST 150 is now balanced (i.e., the number of nodes in the left and right subtrees of each and every node differ, at most, by one). Further, it should be noted that balancing facility 500 accomplishes the balancing without moving the data values. For example, the data values "Eve," "Charles," "Frank" were not moved, but remained in their original locations (i.e., addresses 2, 3, 4, respectively).

As has been described, the present invention provides a simple and efficient means for balancing binary search trees. While the invention has been described within the context of an illustrative embodiment having specific features, those with ordinary skill in the art will appreciate that many of those features could be altered without departing from the fundamental contributions of the present invention. For example, although the BST of the illustrative embodiment has been described as being stored in disk drive 122, the present invention could as well process BSTs that are stored entirely or partially in a more volatile memory, such as RAM 116. Moreover, since data values need not be analyzed, the present invention could also be executed on a first data processing system to balance a BST on a second data processing system without requiring excessive communication bandwidth.

Also, although a particular hardware and software architecture for data processing system 100 has been described, the present invention could also be implemented on data processing systems with other architectures, including, without limitation, multiprocessor data processing systems and mainframe computers. In addition, although extraction facility 600 and tree builder 700 have been illustrated as sets of instructions that are executable on CPU 112, the functions performed by those components could, alternatively, be implemented partially or entirely in hardware.

Furthermore, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A data processing system with facilities for obtaining a balanced binary search tree to optimize searches, said data processing system comprising:

a memory and a processor in communication with said memory;

a collection of at least three nodes and a respective pointer to each node within said collection stored in said memory;

an extraction facility that copies said pointers into a pointer list in accordance with a sequential order of respective data values of said at least three nodes; and a tree builder that builds a balanced binary search tree based on a first index to a first pointer of said pointer list and a second index to a last pointer of said pointer list to determine a root node of said balanced binary search tree.

2. A data processing system according to claim 1, wherein said extraction facility utilizes recursion to copy said pointers into said pointer list.

3. A data processing system according to claim 2, wherein said extraction facility includes:

means for obtaining an input node pointer to a current node;

first calling means for recursively calling said extraction facility with a left child pointer of said current node;

storing means for incrementing a current position and storing said input node pointer in said pointer list at said current position; and second calling means for recursively calling said extraction facility with a right child pointer of said current node; and wherein:

said extraction facility returns without altering said pointer list if said input node pointer is null; and said extraction facility utilizes said first calling means, said storing means, and said second calling means if said input node pointer is not null.

4. A data processing system according to claim 1, wherein said tree builder comprises:

partitioning means for identifying a central pointer at a midpoint of said pointer list, a left range of said pointers before said midpoint, and a right range of said pointers after said midpoint;

means for interpreting said central pointer as a pointer to a root node; and building means for building a balanced left subtree of said root node and a balanced right subtree of said root node based on said left range of said pointers and said right range of said pointers, respectively.

5. A data processing system according to claim 4, wherein said tree builder utilizes recursion to build said balanced left subtree and said balanced right subtree.

6. A data processing system according to claim 5, wherein:

said partitioning means includes means for ascertaining a middle index, a preceding index, and a succeeding index;

said partitioning means identifies said central pointer based on said middle index; and said building means includes:

first calling means for recursively calling said tree builder with said first index and said preceding index to build said left subtree;

second calling means for recursively calling said tree builder with said succeeding index and said second index to build said right subtree; and return means for returning said central pointer; and wherein:

said tree builder returns a null pointer if said first index is greater than said second index; and said tree builder utilizes said partitioning means and said building means if said first index is not greater than said second index.

7. A data processing system according to claim 1 further comprising:

an unbalanced binary search tree including said collection of at least three nodes; and wherein said data values have original locations in said memory; and said tree builder converts said unbalanced binary search tree into said balanced binary search tree without copying said data values to new locations in said memory by altering at least one of said pointers to at least one of said at least three nodes.

8. A program product for obtaining a balanced binary search tree to optimize searches in a data processing system containing a collection of at least three nodes and a respective pointer to each node within said collection, said program product comprising:

an extraction facility that copies said pointers into a pointer list in accordance with a sequential order of respective data values of said at least three nodes;

a tree builder that builds a balanced binary search tree based on a first index to a first pointer of said pointer list and a second index to a last pointer of said pointer list to determine a root node of said balanced binary search tree; and a computer usable medium encoding said extraction facility and said tree builder.

9. A program product according to claim 8, wherein said extraction facility utilizes recursion to copy said pointers into said pointer list.

10. A program product according to claim 9, wherein said extraction facility includes:

means for obtaining an input node pointer to a current node;

first calling means for recursively calling said extraction facility with a left child pointer of said current node;

storing means for incrementing a current position and storing said input node pointer in said pointer list at said current position; and second calling means for recursively calling said extraction facility with a right child pointer of said current node; and wherein:

said extraction facility returns without altering said pointer list if said input node pointer is null; and said extraction facility utilizes said first calling means, said storing means, and said second calling means if said input node pointer is not null.

11. A program product according to claim 8, wherein said tree builder comprises:

partitioning means for identifying a central pointer at a midpoint of said pointer list, a left range of said pointers before said midpoint, and a right range of said pointers after said midpoint;

means for interpreting said central pointer as a pointer to a root node; and building means for building a balanced left subtree of said root node and a balanced right subtree of said root node based on said left range of said pointers and said right range of said pointers, respectively.

12. A program product according to claim 11, wherein said tree builder utilizes recursion to build said balanced left subtree and said balanced right subtree.

13. A program product according to claim 12, wherein:

said partitioning means includes means for ascertaining a middle index, a preceding index, and a succeeding index;

said partitioning means identifies said central pointer based on said middle index; and said building means includes:

first calling means for recursively calling said tree builder with said first index and said preceding index to build said left subtree;

second calling means for recursively calling said tree builder with said succeeding index and said second index to build said right subtree; and return means for returning said central pointer; and wherein:

said tree builder returns a null pointer if said first index is greater than said second index; and said tree builder utilizes said partitioning means and said building means if said first index is not greater than said second index.

14. A program product according to claim 8, wherein:

said data processing system comprises a memory containing an unbalanced binary search tree including said collection of at least three nodes;

said data values have original locations in said memory; and said tree builder converts said unbalanced binary search tree into said balanced binary search tree without copying said data values to new locations in said memory by altering at least one of said pointers to at least one of said at least three nodes.

15. A method within a data processing system for obtaining a balanced binary search tree to optimize searches, said method comprising:

obtaining a collection of at least three nodes and a respective pointer to each node within said collection;

copying said pointers into a pointer list in accordance with a sequential order of respective data values of said at least three nodes; and building a balanced binary search tree based on a first index to a first pointer of said pointer list and a second index to a last pointer of said pointer list to determine a root node of said balanced binary search tree.

16. A method according to claim 15 further comprising utilizing recursion to copy said pointers into said pointer list.

17. A method according to claim 16, wherein said step of copying comprises:

obtaining an input node pointer to a current node;

in response to a determination that said input node pointer is null, returning without altering said pointer list; and in response to a determination that said input node pointer is not null;

recursively calling said extraction facility with a left child pointer of said current node;

incrementing a current position and storing said input node pointer in said pointer list at said current position; and recursively calling said extraction facility with a right child pointer of said current node.

18. A method according to claim 15, wherein said step of building a balanced binary search tree comprises:

identifying a central pointer at a midpoint of said pointer list, a left range of said pointers before said midpoint, and a right range of said pointers after said midpoint;

interpreting said central pointer as a pointer to a root node; and building a balanced left subtree of said root node and a balanced right subtree of said root node based on said left range of said pointers and said right range of said pointers, respectively.

19. A method according to claim 18, further comprising utilizing recursion to build said balanced left subtree and said balanced right subtree.

20. A method according to claim 19 further comprising:

returning a null pointer in response to a determination that said first index is greater than said second index; and in response to a determination that said first index is not greater than said second index:

ascertaining a middle index, a preceding index, and a succeeding index;

utilizing said middle index to identify said central pointer to said root node from said pointer list;

recursively calling said tree builder with said first index and said preceding index to build said left subtree;

recursively calling said tree builder with said succeeding index and said second index to build said right subtree; and returning said central pointer.

21. A method according to claim 15, wherein:

said data processing system comprises a memory containing an unbalanced binary search tree including said collection of at least three nodes;

said data values have original locations in said memory; and said step of building said balanced binary search tree comprises converting said unbalanced binary search tree into said balanced binary search tree without copying said data values to new locations in said memory by altering at least one of said pointers to at least one of said at least three nodes.

* * * * *